United States Patent
Ender et al.

(10) Patent No.: US 9,599,308 B2
(45) Date of Patent: Mar. 21, 2017

(54) HYBRID TAILLIGHT ARTICLE

(71) Applicant: 3M INNOVATIVE PROPERTIES COMPANY, St. Paul, MN (US)

(72) Inventors: David A. Ender, New Richmond, WI (US); Jeremy K. Larsen, Farmington, MN (US); Jennifer J. Sahlin, Minneapolis, MN (US); Michael E. Griffin, Maplewood, MN (US); Karl A. Vick, Elko, MN (US); Bing Hao, Woodbury, MN (US); Scott M. Schnobrich, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/649,566

(22) PCT Filed: Dec. 10, 2013

(86) PCT No.: PCT/US2013/073964
§ 371 (c)(1),
(2) Date: Jun. 4, 2015

(87) PCT Pub. No.: WO2014/105408
PCT Pub. Date: Jul. 3, 2014

(65) Prior Publication Data
US 2016/0215950 A1    Jul. 28, 2016

Related U.S. Application Data

(60) Provisional application No. 61/746,747, filed on Dec. 28, 2012.

(51) Int. Cl.
*B60Q 1/30* (2006.01)
*F21S 8/10* (2006.01)
(Continued)

(52) U.S. Cl.
CPC ........ *F21S 48/2243* (2013.01); *B60Q 1/0058* (2013.01); *B60Q 1/2607* (2013.01);
(Continued)

(58) Field of Classification Search
CPC .............. F21S 48/2275; F21S 48/2281; B60Q 2400/20; B60Q 1/30; B60Q 1/44; B60Q 1/2607
See application file for complete search history.

(56) References Cited

U.S. PATENT DOCUMENTS 1,584,967 A * 5/1926 Andresen ............... G08G 1/095
362/812
1,635,077 A * 7/1927 Erskine .................... B60Q 1/30
40/618
(Continued)

FOREIGN PATENT DOCUMENTS

DE    102004058153    10/2005
DE    102009035521    2/2011
(Continued)

OTHER PUBLICATIONS

PCT International Search Report from PCT/US2013/073964 mailed on Aug. 6, 2014, 7 pages.

*Primary Examiner* — Julie Bannan
(74) *Attorney, Agent, or Firm* — Robert S. Moshrefzadeh

(57) ABSTRACT

A taillight article (100) including an optically clear light guide (110) having an light emission front surface (112) and an opposing rear surface (114) and a side surface (118) separating the front surface (112) and the rear surface (114) is described. A first light source (120) is configured to direct light into the side surface (118) and indicate a first signal-function. A plurality of light extraction features (116) are on or within the optically clear light guide (110) and are configured to direct light from the first light source (120) out through the emission surface (112). A light reflection ele-
(Continued)

ment (130) is spaced apart from the rear surface (114) and defines a cavity (135) that is observable by a viewer.

18 Claims, 2 Drawing Sheets

(51) Int. Cl.
    *B60Q 1/00*     (2006.01)
    *B60Q 1/26*     (2006.01)

(52) U.S. Cl.
    CPC ............. *B60Q 1/2615* (2013.01); *B60Q 1/30* (2013.01); *F21S 48/215* (2013.01); *F21S 48/2268* (2013.01); *F21S 48/2281* (2013.01); *F21S 48/2287* (2013.01); *F21S 48/238* (2013.01)

(56) References Cited

U.S. PATENT DOCUMENTS

| | | | |
|---|---|---|---|
| 5,791,757 | A | 8/1998 | O'Neil et al. |
| 6,102,559 | A | 8/2000 | Nold et al. |
| 6,382,821 | B1* | 5/2002 | Heyer .................. B44C 1/105 362/278 |
| 6,851,843 | B2 | 2/2005 | Müller et al. |
| 6,921,178 | B2 | 7/2005 | Ohkawa |
| 6,955,459 | B2 | 10/2005 | Mochizuki et al. |
| 7,278,768 | B2 | 10/2007 | Gasquet |
| 7,357,549 | B2 | 4/2008 | Günther |
| 7,588,361 | B2 | 9/2009 | Hoelen et al. |
| 7,654,721 | B2 | 2/2010 | Okada |
| 7,695,175 | B2 | 4/2010 | Futami |
| 7,726,854 | B2 | 6/2010 | Bourdin et al. |
| 7,941,013 | B2 | 5/2011 | Martilla et al. |
| 7,985,011 | B2 | 7/2011 | Ajiki et al. |
| 8,206,017 | B2 | 6/2012 | Zwich |
| 2001/0048601 | A1* | 12/2001 | Emmelmann ........ B60Q 1/0058 362/543 |
| 2003/0147253 | A1* | 8/2003 | Shy ..................... B60Q 1/2665 362/545 |
| 2004/0130904 | A1* | 7/2004 | Yamada ............... B60Q 1/0058 362/487 |
| 2005/0259425 | A1* | 11/2005 | Ovenshire ............... G09F 13/04 362/341 |
| 2006/0193144 | A1* | 8/2006 | Braeutigam ......... B60Q 1/2665 362/493 |
| 2007/0139955 | A1 | 6/2007 | Godbillon et al. |
| 2008/0074891 | A1* | 3/2008 | Chuang ................ B60Q 1/2696 362/351 |
| 2008/0259620 | A1 | 10/2008 | Oba et al. |
| 2009/0097264 | A1* | 4/2009 | Dunn ..................... F21S 48/328 362/373 |
| 2009/0219731 | A1* | 9/2009 | Martin .................. F21S 48/215 362/509 |
| 2009/0251917 | A1 | 10/2009 | Wollner et al. |
| 2010/0008088 | A1 | 1/2010 | Koizumi et al. |
| 2010/0254152 | A1* | 10/2010 | Taleb-Bendiab ..... B60Q 1/0035 362/551 |
| 2010/0309677 | A1 | 12/2010 | Kazaoka |
| 2012/0020103 | A1 | 1/2012 | Okada |
| 2012/0039084 | A1 | 2/2012 | Eckhardt et al. |
| 2012/0113659 | A1 | 5/2012 | Hermitte et al. |
| 2012/0120672 | A1 | 5/2012 | Stagg et al. |
| 2012/0126038 | A1 | 5/2012 | Carpenter et al. |
| 2012/0163028 | A1 | 6/2012 | Chung et al. |
| 2013/0182450 | A1 | 7/2013 | Buisson |

FOREIGN PATENT DOCUMENTS

| | | |
|---|---|---|
| DE | 102010006348 A1 | 8/2011 |
| EP | 0 704 655 B1 | 3/1999 |
| EP | 1 835 224 | 9/2007 |
| EP | 2 103 972 A1 | 9/2009 |
| EP | 2 108 883 A2 | 10/2009 |
| JP | 2006114309 | 4/2006 |
| WO | WO 2012/056799 A1 | 5/2012 |

\* cited by examiner

HYBRID TAILLIGHT ARTICLE

FIELD

The disclosure relates to taillight articles and particularly to taillight articles that include an optically clear light guide providing vehicle signal function and aesthetic function.

BACKGROUND

The automotive industry has recently been adopting LED technology in tail light, head light, and other signal light applications. In some cases a combination of LED and incandescent technology is used. In other cases, lamps use solely LEDs as sources. Tail lamps with tens or even more than a hundred LEDs are observed. In general, free-space optics have been used. Disadvantages with such an approach include the need for large cavities requiring more trunk space and the additional indirect cost associated with the generally necessary metal-working of the vehicle frame housing the lamp.

More recently, solid light guides have been proposed for the rear running light or for cosmetic purposes. In general, these solid light guides have introduced the challenges of being bulky, heavy, and not especially uniform in their light emission without the use of other optical elements such as diffusers. Such optical elements add additional complexity, cost and reduce light brightness. Light extraction from these light guides generally occurs by a change in thickness of the guide. This requires one end of the guide to be thicker leading to the increased bulk. It also provides little independent control of the direction of the emission. Alternatively, extraction can occur with structural modification of one surface or by painted dots either of which can occlude visibility through the light guide.

From a decorative stand-point, LEDs are point sources that are easily resolved at standard viewing distances. LEDs have been used in direct lit signal functions, however this point light source appearance may not be appealing to a viewer due to brightness, glare and other reasons. In addition, vehicle tail lamp assemblies contain multiple signal functions. Each of these signal functions has unique color, uniformity, and intensity requirements. The running light, which is operational during vehicle operation at night, is generally red or red-amber light. The stop light, which is activated intermittently, is often the same color as the running light but is generally more intense. The back-up light is generally white light and finally, the signal light, is generally either yellow, amber or red light.

BRIEF SUMMARY

The disclosure relates to taillight articles and particularly to taillight articles that include an optically clear light guide providing vehicle signal function and aesthetic function. The taillight includes a cavity that can include direct lit signal functions and other aesthetic features that are observable through the optically clear light guide, especially in an "off" state.

In one aspect of the disclosure, a taillight article includes an optically clear light guide having a light emission front surface, an opposing rear surface, and a side surface separating the front surface and the rear surface. A first light source is configured to direct light into the side surface and indicates a first signal function. A plurality of light extraction features are positioned on or within the optically clear light guide and are configured to direct light from the first light source out through the emission surface. A light reflection element is spaced apart from the rear surface of the optically clear light guide and defines a cavity that is observable by a viewer.

In one or more embodiments, the plurality of light extraction features is disposed on or adjacent to the rear surface of the optically clear light guide. In one or more embodiments, the cavity has a thickness in a range from 1 to 50 mm. In one or more embodiments, the first light source is configured to direct colored light into the side surface.

In one or more embodiments, the optically clear light guide is curved. In many of these embodiments, the plurality of light extraction features is disposed on or adjacent to the front surface of the optically clear light guide.

In one or more embodiments, the light extraction features have a feature size in a range from 5 to 750 micrometers. In one or more embodiments, an adhesive is disposed on a rear surface of the taillight article to fix the taillight article to a vehicle. In one or more embodiments, the light reflection element is colored. In one or more embodiments, the light reflection element includes indicia or graphical elements that are observable by a viewer. In one or more embodiments, the taillight article has a total thickness in a range from 2 to 30 cm. In one or more embodiments, the light reflection element reflects at least 70% or at least 90% of incident light.

In one or more embodiments, the taillight article further includes a second light source providing a second signal function disposed within the cavity. In one or more embodiments, the first signal function is a running light function or a turning signal function and the second signal function is a braking signal function or back-up signal function.

In one or more embodiments, the taillight article further includes a third light source indicating a third signal function disposed within the cavity, wherein the first signal function, second signal function and third signal function are all different signal functions. In one or more embodiments, the second light source or third light source directs light through the optically clear light guide.

In one or more embodiments, the taillight article further includes a fourth light source indicating a fourth signal function and the fourth light source is disposed within the taillight article. In one or more embodiments, the first signal function, second signal function, third signal function and fourth signal function are a combination of a running light function, a braking light function, a back-up light function and a turning signal function.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Figure 1:
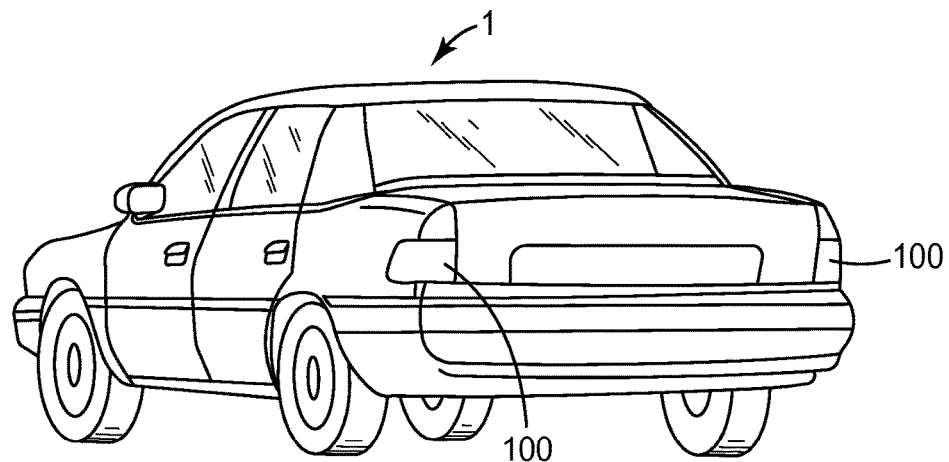
FIG. 1 is a schematic perspective view of a vehicle with illustrative taillights.

In the following detailed description, reference is made to the accompanying drawings that form a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

The term "optically clear" refers to an element being transparent to a viewer so that a viewer can easily discern what the optically clear element is separating from the viewer. Visible light can transmit through an optically clear element. In many embodiments, an optically clear element is colorless such as clear glass. Extractors or extraction features may be present in an optically clear region, but their density and size are small enough to enable optical clarity, as described below.

The term "signal function" refers to a light indication of a running light indication, a braking light indication, a back-up light indication or a turning light indication.

The disclosure relates to taillight articles and particularly to taillight articles that includes an optically clear light guide providing vehicle signal function and aesthetic function, among other aspects. The taillight includes a cavity that can include direct lit signal functions and other aesthetic features that are observable through the optically clear light guide, especially in an "off" state. The optically clear light guide and corresponding taillight article can be curved and emit light uniformly along the curved and non-curved portions of the optically clear light guide. The disclosed taillight articles include an optically clear light guide providing vehicle signal function and aesthetic function and they offer enhanced design flexibility by creating an interesting "off" state by incorporating visual elements (e.g., depth) in the cavity that can be viewed through the optically clear light guide. While the present disclosure is not so limited, an appreciation of various aspects of the disclosure will be gained through a discussion of the examples provided below.

Figure 2:
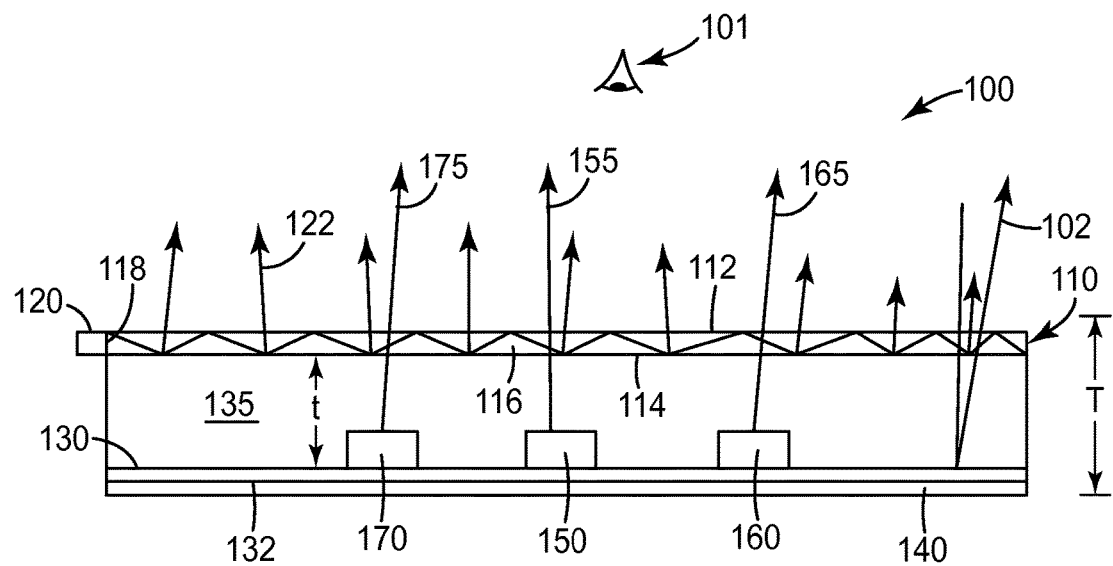
FIG. 2 is a schematic cross-sectional view of an illustrative taillight.
Figure 3:
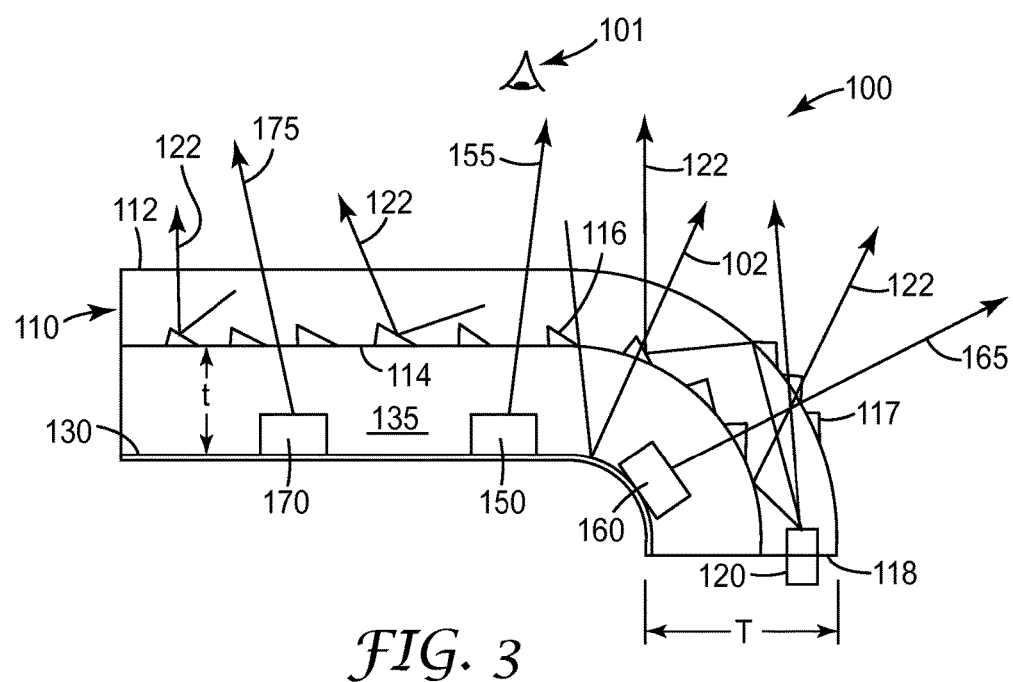
FIG. 3 is a schematic cross-sectional view of a curved illustrative taillight.

FIG. 1 is a schematic perspective view of a vehicle 1 with illustrative taillights 100. FIG. 2 is a schematic cross-sectional view of an illustrative taillight 100. FIG. 3 is a schematic cross-sectional view of a curved illustrative taillight 100. While the taillight article 100 is illustrated as a rectangular element on the rear of a vehicle 1, it is understood that the taillight article 100 can have any useful shape and be placed in any useful location on a vehicle. For example, in the case of a curved taillight, such as the taillight illustrated in FIG. 3, the taillight may curve around the back corners of the vehicle, such that a portion of the taillight is co-planar or near co-planar with the back of the car, and a portion of the taillight is co-planar or near co-planar with the side of the car.

In many embodiments, a taillight article 100 includes an optically clear light guide 110 having an light emission front surface 112 and an opposing rear surface 114 and a side surface 118 separating the front surface 112 and the rear surface 114. The optically clear light guide 110 can be flat or planar as illustrated in FIG. 2 or curved as illustrated in FIG. 3.

Visible light 102 can transmit through the optically clear light guide 110 so that a viewer 101 can discern what is within a cavity 135 of the taillight article 100. In one or more embodiments indicia or graphical elements can be disposed within the cavity 135 of the taillight article 100. The visible light 102 can transmit through the optically clear light guide 110 from the external environment and reflect off the indicia or graphical elements and return back to a viewer 101 such that a viewer 101 can observe the indicia or graphical elements within the cavity 135 of the taillight article 100. Indicia or graphical elements can be any useful indicia or graphical elements that provide a structured, faceted or jewel-like appearance, for example. In some embodiments, the indicia may be a brand or model name for a vehicle.

A first light source 120 is configured to direct light into the side surface 118 of the optically clear light guide 110. In one or more embodiments, the first light source 120 indicates a first signal function. A first signal function is a light indication of a running light indication, a braking light indication, a back-up light indication or a turning light indication. In many embodiments, the first signal function is a red running light signal function. In these embodiments, the first light source 120 is configured to direct red light into the side surface 118 of an optically clear light guide 110. The first light source 120 can be any useful light source and can be one or a plurality of light sources. In one or more embodiments, the first light source 120 is a solid state light source such as a light emitting diode (LED), for example.

A plurality of light extraction features 116 are on or within the optically clear light guide 110. The light extraction features 116 are configured to direct light 122 from the first light source 120 out through the emission surface 112. In one or more embodiments, the light extraction features 116 are disposed on the rear surface 114 of the optically clear light guide 110, as illustrated in FIG. 2 and FIG. 3. In some embodiments, the light extraction features 116 are disposed on the front surface 112 of the optically clear light guide 110, as illustrated in FIG. 3, especially in embodiments that utilize curved light guides 110. Curved light guides 110 have additional challenges to providing uniform illumination along the curved light guide.

Figure 4:
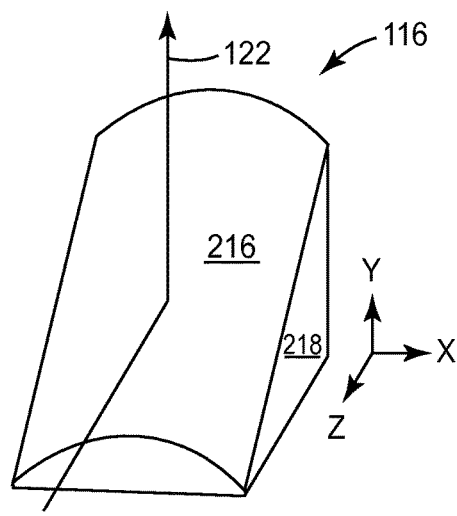
FIG. 4 is a schematic perspective view of an illustrative light extraction feature.
Figure 5:
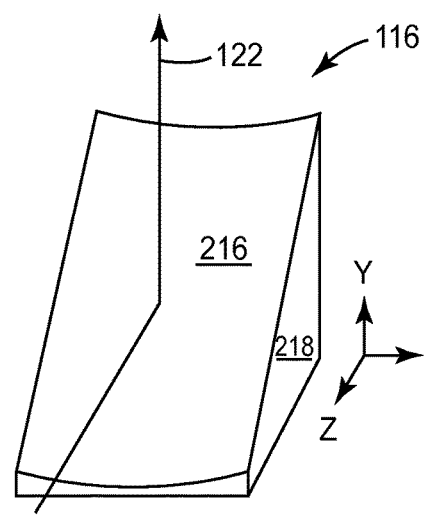
FIG. 5 is a schematic perspective view of another illustrative light extraction feature.

FIG. 4 is a schematic perspective view of an illustrative light extraction feature 116. FIG. 5 is a schematic perspective view of another illustrative light extraction feature 116. The extraction features 116 can have any useful shape that will direct light out of the optically clear light guide 110. In one or more embodiments, the extraction features 116 are generally not discernible under observation from a viewer 101. In many embodiments, the extraction features 116 are patterned to provide uniform illumination along an entire lateral dimension of the optically clear light guide 110 from the first light source 120. In some embodiments, the light extraction features 116 form a pattern that illuminates as an indicia or a graphical element that is observable by a viewer.

For purposes of this description, where a direction corresponds to a provided axis of a coordinate system (see FIG. 4 and FIG. 5), for example the y-axis, it may be referred to as, e.g., "the y-direction." The z-direction is perpendicular to the x-direction along which the light guide 110 emission surface 112 extends. The y-direction is perpendicular to the x-direction and z-direction and extends in an out-of-plane direction from the light guide 110 emission surface 112.

In order to direct signal function light along the y-direction that is initially generally propagated along the z-direction, it is necessary to appropriately choose proper light extraction element shapes, orientation, and potentially spacing. A number of different shapes of light extraction elements are contemplated in the present description, for example, the light extraction features 116 may be prisms, cones, aspheric cones, truncated prisms, cones, aspheric cones, wedges, hemispheres, conic sections, or truncated conic sections. A further description of these shapes and other appropriate light extraction features, as well as potential method of making such shapes may be found in commonly owned U.S. Pat. No. 7,941,013 (Martilla et al.), the relevant portions of which are hereby incorporated by reference. A method of forming the appropriate light extraction features is also described in commonly owned U.S. Patent Application Publication No. 2012/0126038 (Carpenter et al.), the relevant portions of which are hereby incorporated by reference.

In one or more embodiments, the light extraction features 116 may be wedges, as illustrated in FIG. 4 and FIG. 5. The wedge shown in FIG. 4 is a wedge having negative cylindrical sag. The wedge shown in FIG. 5 is a wedge having positive cylindrical sag. Both of these shapes are contemplated as appropriate light extractor 116 shapes in the present description. These light extraction features project into the solid light guide.

It is also important to properly orient the light extraction feature 116 in FIG. 4 and FIG. 5 with respect to the incident light from first light source 120. This provides the selective extraction of light desired in the present description. A facet or light reflection face 216 faces the first light source 120 (along a z-direction for example) and reflects signal function light 122 emitted from the first light source 120 along a y-direction (for example) and out of the optically clear light guide 110. Light that is incident on a side surface 218, or any surface other than the facet or light reflection face 216 will not substantially reflect light 122 in the y-direction and direct light 122 out of the optically clear light guide 110.

In one or more embodiments, the extraction features 116 may not exhibit selectivity. Examples include cones, aspheres, or other shapes exhibiting rotational symmetry about an axis normal to the light guide.

In one or more embodiments, the light extraction features 116 have a feature size (e.g., largest lateral dimension) in a range from 5 to 750 micrometers or from 30 to 600 micrometers. In some embodiments the light extraction features increase in size as a distance from the light source increases. In general, the extraction efficiency should increase as distance from the light source increases to maintain uniform extraction across the top surface of the light guide. In some embodiments the light extraction features increase in size as a distance from the light source increases. In some embodiments, extractor efficiency is increased by orientation, positioning, or increasing the density of the light extraction features, or other means.

Proper sizing and spacing of light extraction features provides an "optically clear" appearance. In one or more embodiments the light extraction features have a feature size (i.e., largest lateral dimension) in a range from 5 to 600 micrometers and an average spacing (ie., minimum lateral distance) in a range from 125 to 725 micrometers, where smaller light extraction features may be spaced further from one another than larger light extraction features. In one or more embodiments the light extraction features have a feature size (i.e., largest lateral dimension) in a range from 20 to 450 micrometers and an average spacing (ie., minimum lateral distance) in a range from 125 to 725 micrometers. In one or more embodiments the light extraction features have a feature size (i.e., largest lateral dimension) in a range from 30 to 350 micrometers and an average spacing (ie., minimum lateral distance) in a range from 125 to 725 micrometers. In some embodiments, a portion of the light extraction features may be visible to a viewer 101 and can have a size in a range from 3000 to 6000 micrometers.

A light reflection element 130 can be spaced apart from the rear surface 114 of the optically clear light guide 110 and define a cavity 135 that is observable by a viewer 101. In one or more embodiments, the cavity 135 is an air space having a thickness t in a range from 1 to 50 mm or from 1 to 30 mm or from 1 to 20 mm.

In one or more embodiments, the light reflection element 130 is a mirror film or a vapor coated metal layer. The light reflection element 130 reflects at least 70% or at least 90% of incident light 102. In one or more embodiments, the light reflection element 130 is colored, for example, to match a color of the exterior of the vehicle 1. In one or more embodiments, the light reflection element 130 includes indicia or graphical elements that are observable by a viewer. Indicia or graphical elements can be any useful indicia or graphical elements that provide a structured, faceted or jewel-like appearance, for example. In one or more embodiments, during an "off-state" (e.g., when the taillight 100 is not indicating a signal function) the light reflection element 130 (provides a "depth" to the appearance) and/or the indicia or graphical elements may be observed by a viewer to provide unique aesthetic features.

In one or more embodiments, the taillight article 100 further include a second light source 150 providing a second signal function and being disposed within the cavity 135. In one or more embodiments, the first signal function is a running light function or a turning signal function and the second signal function is a braking signal function or back-up signal function. In many embodiments, the second light source 150 directs light 155 through the optically clear light guide 110.

In one or more embodiments, the taillight article 100 further includes a third light source 160 indicating a third signal function disposed within the cavity 135. The first signal function, second signal function and third signal function can be different signal functions. In one or more embodiments, the third light source 160 directs light 165 through the optically clear light guide 110.

In one or more embodiments, the taillight article 100 further includes a fourth light source 170 indicating a fourth signal function, and the fourth light source is disposed within the taillight article 100. In one or more embodiments, the first signal function, second signal function, third signal function and fourth signal function are a combination of a running light function, a braking light function, a back-up light function and a turning signal function. In many embodiments, the fourth light source 170 is disposed within the cavity 135 and directs light 175 through the optically clear light guide 110.

In one or more embodiments, the taillight article 100 further include an adhesive 140 disposed on a rear surface 132 of the taillight article 100. The adhesive 140 can be configured to fix the taillight article 100 to a vehicle 1. In many embodiments, the adhesive 140 is a pressure sensitive adhesive.

The taillight article can have any useful thickness. One illustrative advantage of the taillight articles 100 described herein is the thin form factor for fixing onto a vehicle. In one or more embodiments, the taillight article 100 has a total thickness T in a range from 2 to 30 cm or in a range from 2 to 20 cm or from 2 to 10 cm.

The following is a listing of the items of the present disclosure:

Item 1 is a taillight article comprising:
an optically clear light guide having a light emission front surface and an opposing rear surface and a side surface separating the front surface and the rear surface;
a first light source configured to direct light into the side surface, the first light source indicating a first signal function;
a plurality of light extraction features on or within the optically clear light guide, the light extraction features configured to direct light from the first light source out through the emission surface; and
a light reflection element spaced apart from the rear surface of the optically clear light guide and defining a cavity that is observable by a viewer.

Item 2 is a taillight article according to item 1, wherein the plurality of light extraction features are disposed on or adjacent to the rear surface of the optically clear light guide.

Item 3 is a taillight article according to any of the preceding items, wherein the cavity has a thickness in a range from 1 to 50 mm.

Item 4 is a taillight article according to any of the preceding items, wherein the first light source is configured to direct colored light into the side surface.

Item 5 is a taillight article according to any of the preceding items, wherein the optically clear light guide is curved.

Item 6 is a taillight article according to item 5, wherein a portion of the light extraction features is disposed on or adjacent to the front surface of the optically clear light guide.

Item 7 is a taillight article according to any of the preceding items, wherein the light extraction features have a feature size in a range from 5 to 750 micrometers.

Item 8 is a taillight article according to any of the preceding items, wherein an adhesive is disposed on a rear surface of the taillight article, the adhesive being configured to fix the taillight article to a vehicle.

Item 9 is a taillight article according to any of the preceding items, wherein the light reflection element is colored.

Item 10 is a taillight article according to any of the preceding items, wherein the light reflection element comprises indicia or a graphical element that is observable by a viewer.

Item 11 is a taillight article according to any of the preceding items, wherein the taillight article has a total thickness in a range from 2 to 30 cm.

Item 12 is a taillight article according to any of the preceding items, further comprising a second light source providing a second signal function disposed within the cavity.

Item 13 is a taillight article according to item 12, further comprising a third light source indicating a third signal function disposed within the cavity, wherein the first signal function, second signal function and third signal function are all different signal functions.

Item 14 is a taillight article according to items 12 or 13, wherein the second light source or third light source direct light through the optically clear light guide.

Item 15 is a taillight article according to any of items 12 to 14, wherein the first signal function is a running light function or a turning signal function and the second signal function is a braking signal function or back-up signal function.

Item 16 is a taillight article according to any of items 12 to 14, further comprising a fourth light source indicating a fourth signal function, the fourth light source disposed within the taillight article, wherein the first signal function, second signal function, third signal function and fourth signal function are a combination of a running light function, a braking light function, a back-up light function and a turning signal function.

Item 17 is a taillight article according to any of the preceding items, wherein the light reflection element reflects at least 70% of incident light.

Item 18 is a taillight article according to any of the preceding items, wherein the light reflection element reflects at least 90% of incident light.

Item 19 is a taillight article according to any of the preceding items, wherein the light extraction features form a pattern that illuminates as indicia or graphical elements that are observable by a viewer.

Embodiments of the present disclosure are disclosed. The disclosed embodiments are presented for purposes of illustration and not limitation. The implementations described above and other implementations are within the scope of the following claims. One skilled in the art will appreciate that the present disclosure can be practiced with embodiments other than those disclosed. Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the present disclosure. The scope of the present application should, therefore, be determined only by the following claims.

What is claimed is:

1. A taillight article comprising:
an optically clear light guide having a light emission front surface and an opposing rear surface and a side surface separating the front surface and the rear surface;
a first light source configured to direct light into the side surface, the first light source indicating a first signal function;
a plurality of light extraction features on or within the optically clear light guide, the light extraction features configured to direct light from the first light source out through the emission surface, each light extraction feature being a wedge having a cylindrical light reflection face; and
a light reflection element spaced apart from the rear surface of the optically clear light guide and defining a cavity that is observable by a viewer, wherein the light reflection element comprises indicia or a graphical element that is observable by a viewer.

2. A taillight article according to claim 1, wherein the plurality of light extraction features are disposed on or adjacent to the rear surface of the optically clear light guide.

3. A taillight article according to claim 1, wherein the cavity has a thickness in a range from 1 to 50 mm.

4. A taillight article according to claim 1, wherein the first light source is configured to direct colored light into the side surface.

5. A taillight article according to claim 1, wherein the optically clear light guide is curved.

6. A taillight article according to claim 5, wherein a portion of the light extraction features is disposed on or adjacent to the front surface of the optically clear light guide.

7. A taillight article according to claim 1, wherein the light extraction features have a feature size in a range from 5 to 750 micrometers.

8. A taillight article according to claim 1, wherein an adhesive is disposed on a rear surface of the taillight article, the adhesive being configured to fix the taillight article to a vehicle.

9. A taillight article according to claim 1, wherein the light reflection element is colored.

10. A taillight article according to claim 1, wherein the taillight article has a total thickness in a range from 2 to 30 cm.

11. A taillight article according to claim 1, further comprising a second light source providing a second signal function disposed within the cavity.

12. A taillight article according to claim 11, further comprising a third light source indicating a third signal function disposed within the cavity, wherein the first signal function, second signal function and third signal function are all different signal functions.

13. A taillight article according to claim 11, wherein the second light source or third light source direct light through the optically clear light guide.

14. A taillight article according to claim 11, wherein the first signal function is a running light function or a turning signal function and the second signal function is a braking signal function or back-up signal function.

15. A taillight article according to claim 12, further comprising a fourth light source indicating a fourth signal function, the fourth light source disposed within the taillight article, wherein the first signal function, second signal function, third signal function and fourth signal function are a combination of a running light function, a braking light function, a back-up light function and a turning signal function.

16. A taillight article according to claim 1, wherein the light reflection element reflects at least 70% of incident light.

17. A taillight article according to claim 1, wherein the light reflection element reflects at least 90% of incident light.

18. A taillight article according to claim 1, wherein the light extraction features form a pattern that illuminates as indicia or graphical elements that are observable by a viewer.

* * * * *

UNITED STATES PATENT AND TRADEMARK OFFICE
CERTIFICATE OF CORRECTION

PATENT NO. : 9,599,308 B2
APPLICATION NO. : 14/649566
DATED : March 21, 2017
INVENTOR(S) : David Ender Page 1 of 1

It is certified that error appears in the above-identified patent and that said Letters Patent is hereby corrected as shown below:

In the Drawings

Sheet 2 of 2 (FIG. 5):

Line 3 (approx.), delete " " and insert -- -- --, therefor.

Signed and Sealed this
Nineteenth Day of September, 2017

Joseph Matal
*Performing the Functions and Duties of the
Under Secretary of Commerce for Intellectual Property and
Director of the United States Patent and Trademark Office*